Dec. 17, 1940. R. E. WALLISER Re. 21,665

MACHINE FOR MAKING AND APPLYING TUFTS AND THE LIKE

Original Filed Sept. 27, 1926 5 Sheets-Sheet 1

Witnesses:
C. E. Wessels
B. G. Richards

Inventor:
Robert E. Walliser
By Joshua R. H. Potts
his Attorney

Dec. 17, 1940. R. E. WALLISER Re. 21,665
MACHINE FOR MAKING AND APPLYING TUFTS AND THE LIKE
Original Filed Sept. 27, 1926 5 Sheets-Sheet 2
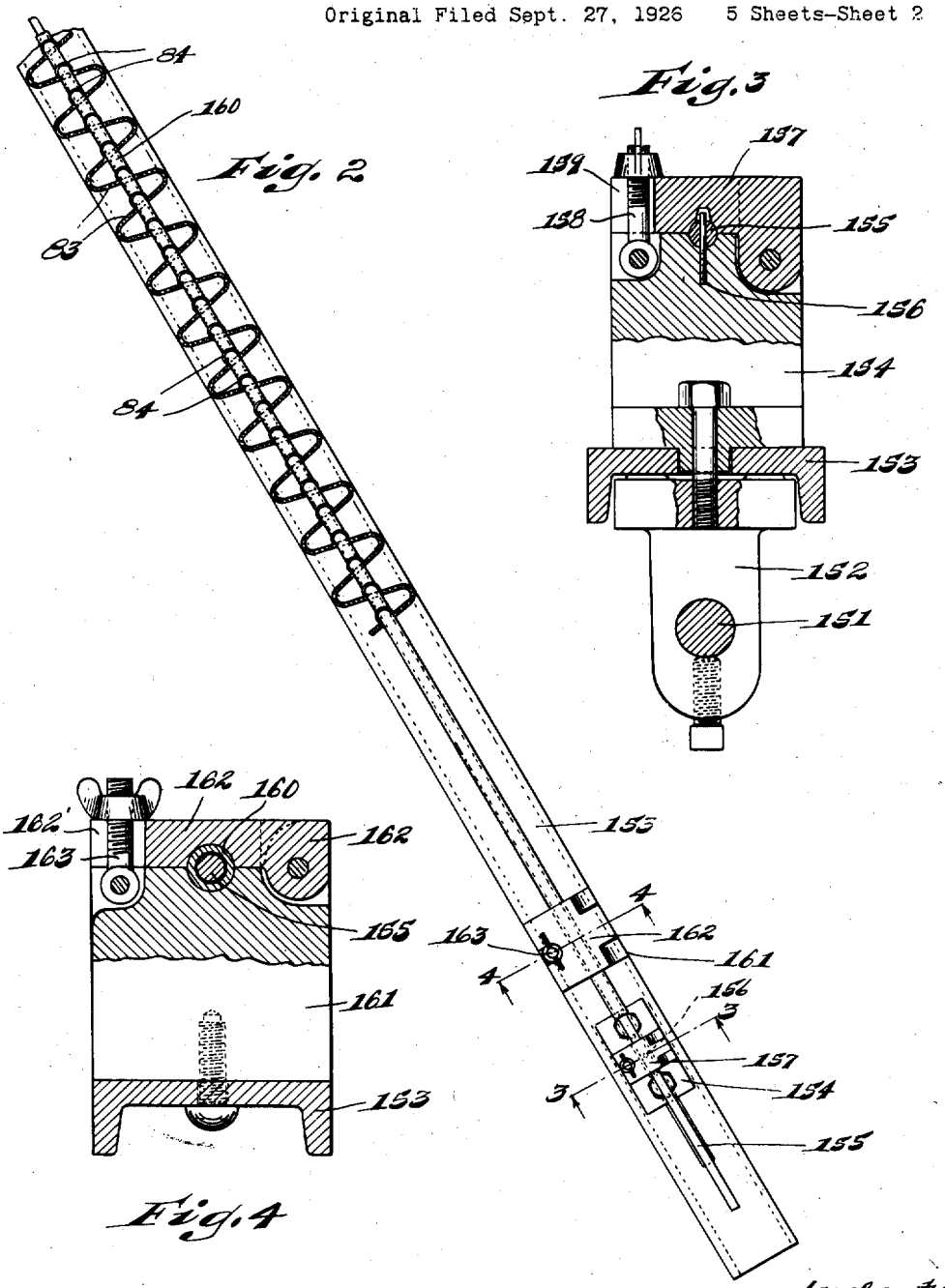
Inventor:
Robert E. Walliser,
By Joshua R. H. Pope
his Attorney.
Witnesses:
E. E. Weisels
B. G. Richards MACHINE FOR MAKING AND APPLYING TUFTS AND THE LIKE
Original Filed Sept. 27, 1926 5 Sheets-Sheet 3
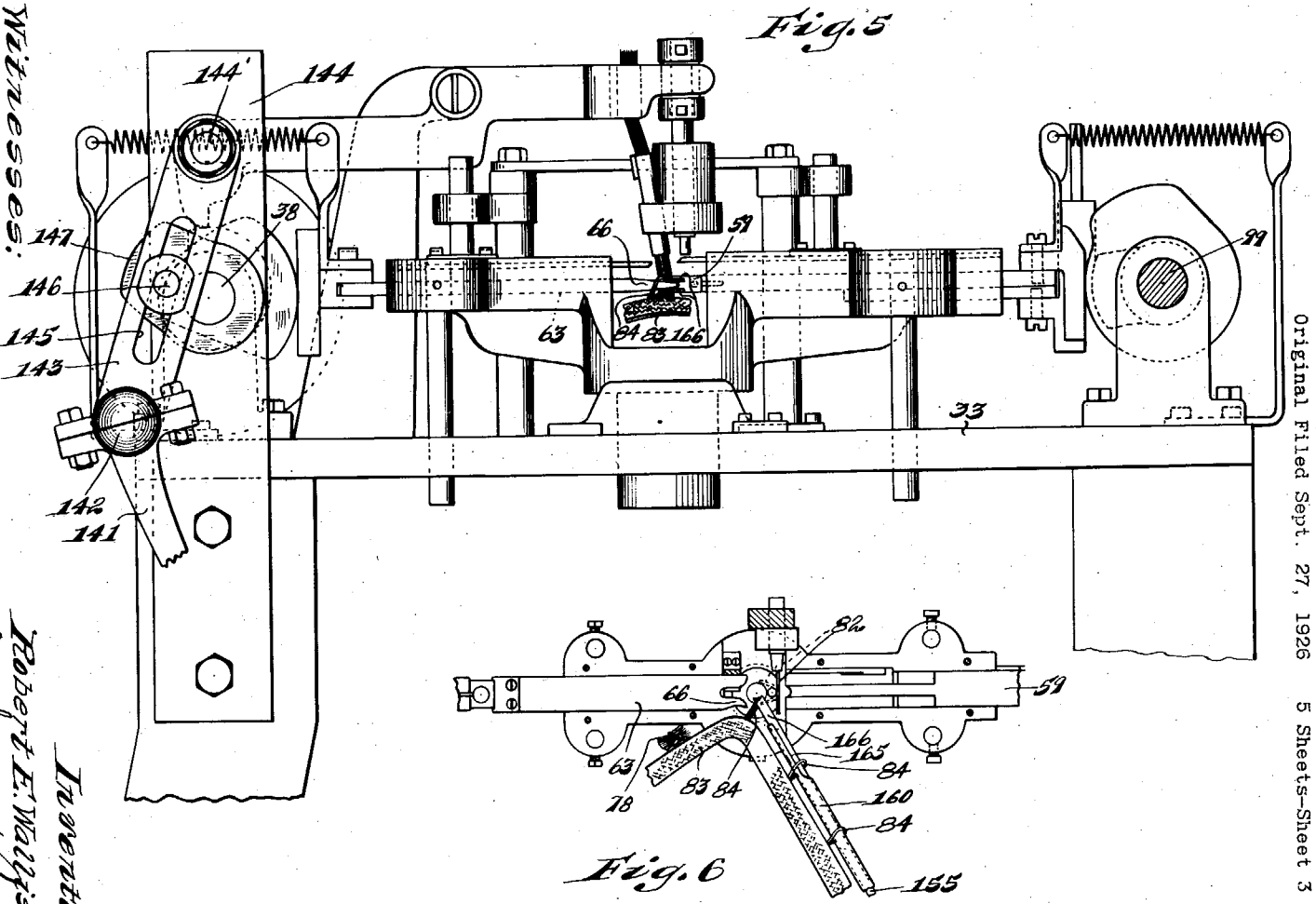
Witnesses:
E. E. Wessels.
B. M. Richards
Inventor:
Robert E. Walliser:
By Joshua R. H. Orth
his Attorney.

Dec. 17, 1940. R. E. WALLISER Re. 21,665
MACHINE FOR MAKING AND APPLYING TUFTS AND THE LIKE
Original Filed Sept. 27, 1926 5 Sheets-Sheet 4
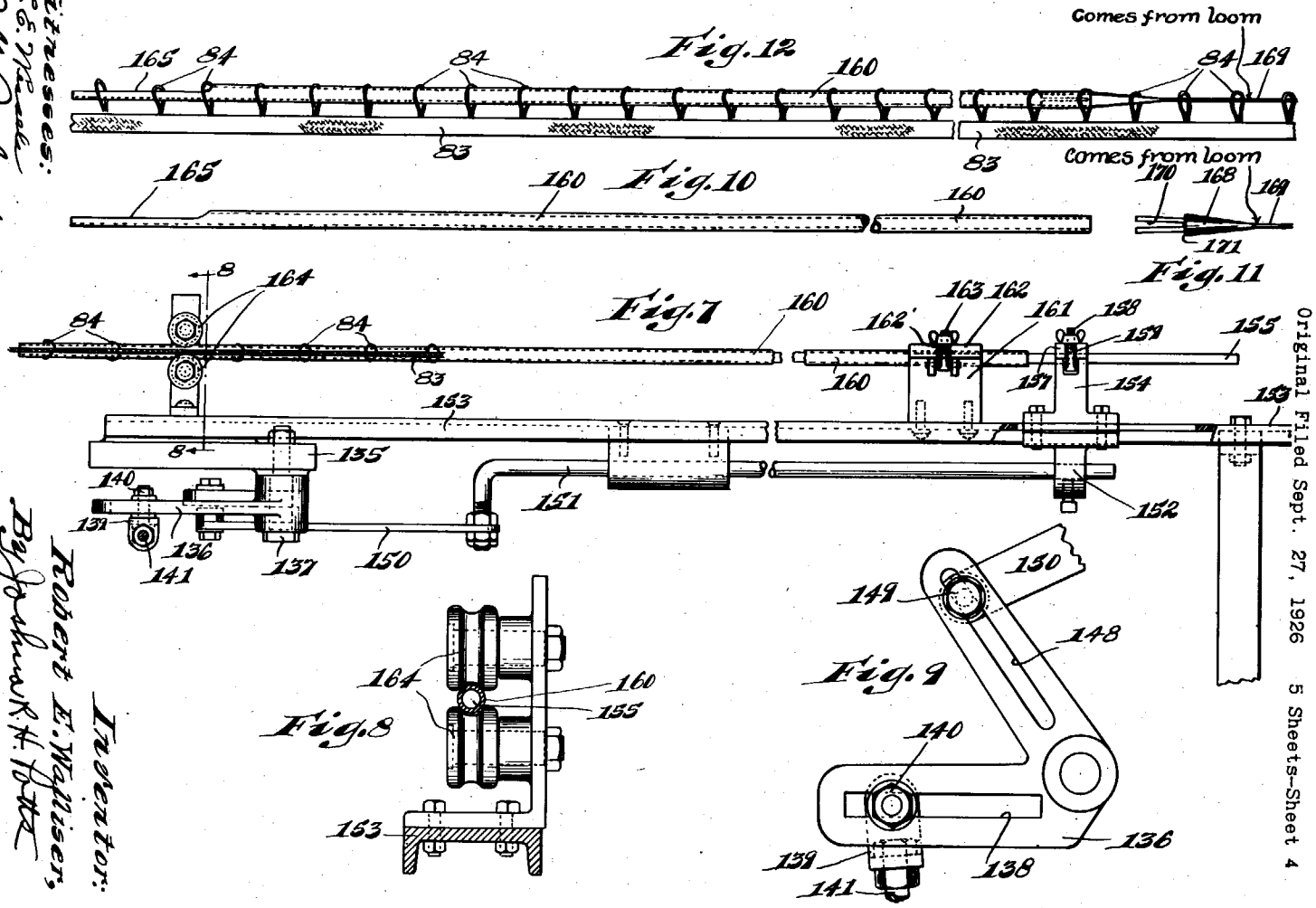
Witnesses:
E. E. Wessels
B. G. Richards
Inventor:
Robert E. Walliser,
By Joshua R. H. Potts
his Attorney Dec. 17, 1940. R. E. WALLISER Re. 21,665

MACHINE FOR MAKING AND APPLYING TUFTS AND THE LIKE

Original Filed Sept. 27, 1926 5 Sheets-Sheet 5

Witnesses:
E. E. Weasels.
B. G. Richards

Inventor:
Robert E. Walliser:
By Joshua R. H. Fork
his Attorney

Reissued Dec. 17, 1940

Re. 21,665

UNITED STATES PATENT OFFICE 21,665

MACHINE FOR MAKING AND APPLYING TUFTS AND THE LIKE

Robert E. Walliser, Libertyville, Ill., assignor, by mesne assignments, to L. G. Blessing Original No. 1,660,536, dated February 28, 1928, Serial No. 137,938, September 27, 1926. Application for reissue March 13, 1939, Serial No. 261,630

16 Claims. (Cl. 28—2)

My invention relates to improvements in machines for making and applying tufts and the like, and has for its object the provision of an improved machine of this character by means of which tufts, tassels and other ornamentation may be automatically and rapidly applied to looped headings and the like, the present exemplification of my invention being in the form of attachment or addition to the machine disclosed in the patent to C. F. Arnold, No. 1,390,267, dated September 13, 1921.

Other objects will appear hereinafter.

The invention consists in the combinations and arrangements of parts hereinafter described and claimed.

Figure 1:
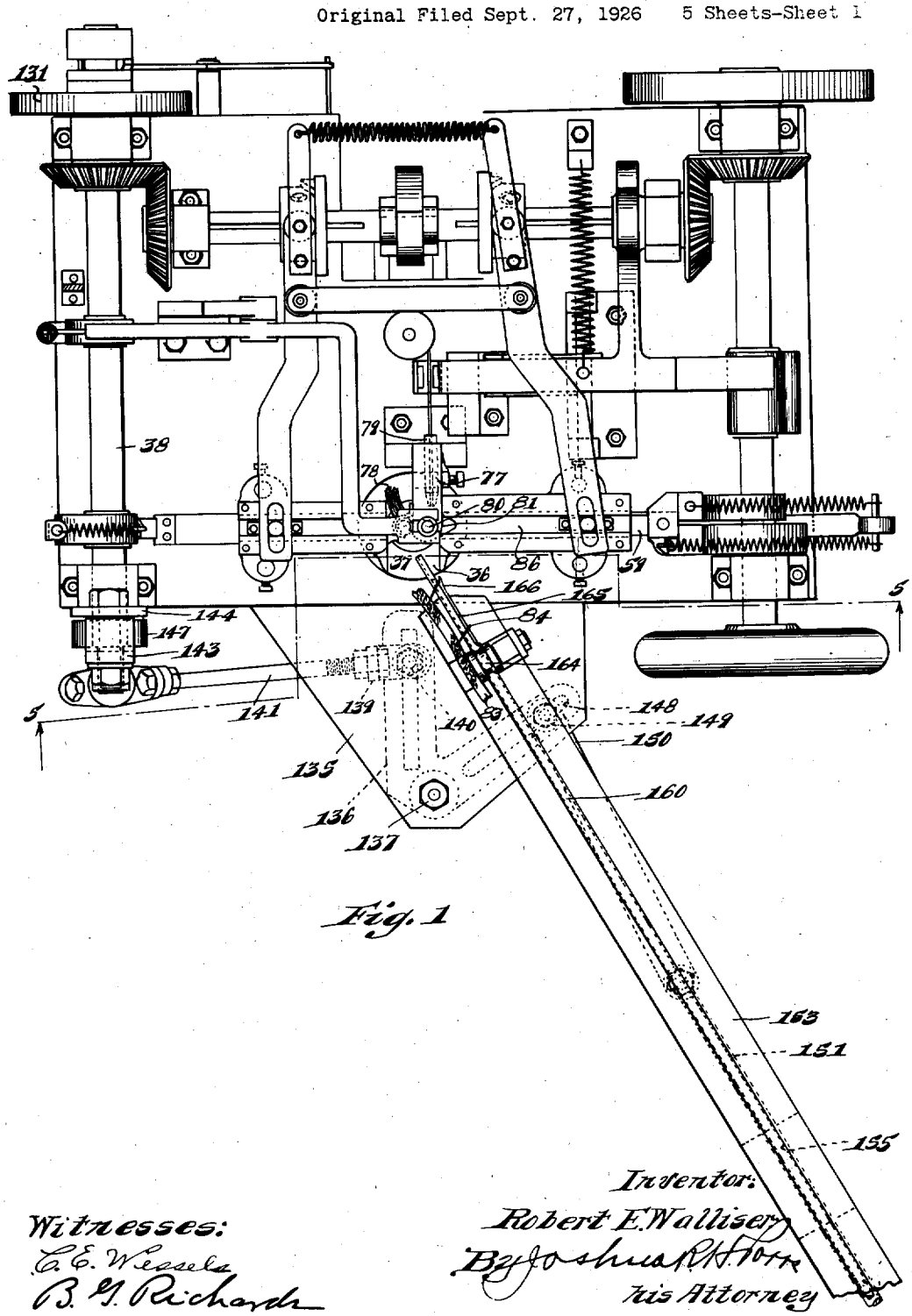
Figure 13:
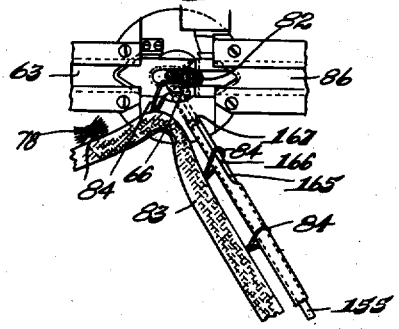
Figure 14:
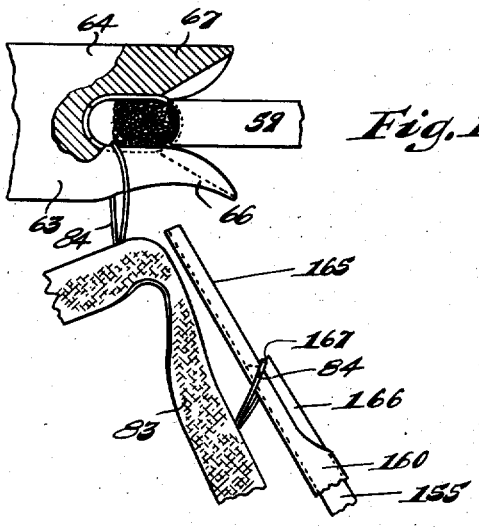
Figure 15:
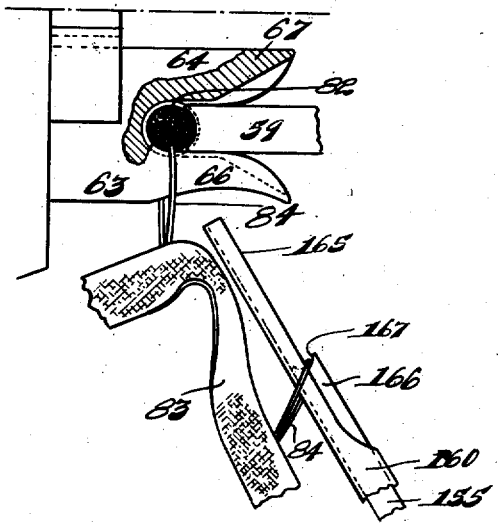
Figure 18:
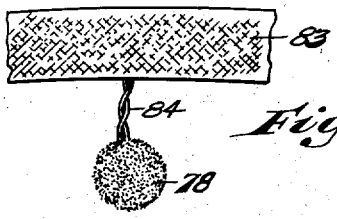
Figure 17:
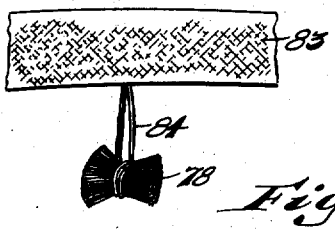
Figure 16:
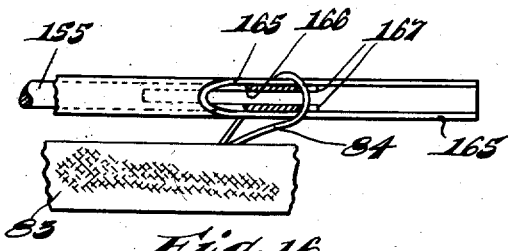

The invention will be best understood by reference to the accompanying drawings forming a parts of this specification, and in which:

Fig. 1 is a partial top plan view of a machine embodying the invention,

Fig. 2 is an enlarged partial detail view of a guide tube and its support employed in the machine, Fig. 3 is an enlarged detail section taken on line 3—3 of Fig. 2, Fig. 4 is a similar section taken on line 4—4 of Fig. 2, Fig. 5 is a sectional view taken substantially on line 5—5 of Fig. 1, Fig. 6 is a detail plan view illustrating the feeding attachment in delivery position, Fig. 7 is a partial side view of the automatic feeding attachment, Fig. 8 is a section taken substantially on line 8—8 of Fig. 7, Fig. 9 is a detail view of a bell crank lever employed in operating the feeding attachment, Fig. 10 is a partial detail view of a feed guide tube employed in the feeding attachment, Fig. 11 is a detail view of a juncture member employed in loading the said guide tube, Fig. 12 is a detail view illustrating the positions of the parts when the guide tube is being loaded, Fig. 13 is a detail view illustrating the feeding attachment in initial position, Fig. 14 is an enlarged view illustrating the feeding attachment in an intermediate position, Fig. 15 is a similar view illustrating the parts at a later stage, Fig. 16 is a side view corresponding with Fig. 15, Fig. 17 is a view of the work as it comes from the machine, and Fig. 18 is a view of a completed tuft applied to a looped heading.

The exemplification of the invention illustrated in the drawings is in the form of an attachment to the machine disclosed in the patent to Arnold, No. 1,390,267, dated September 13, 1921, and therefore said machine requires no detailed description here. Suffice it to say that the said Arnold machine in its normal operation serves to make and apply the tufts 78 to the loops 84 on the heading 83, the same reference characters employed in said Arnold patent being repeated in the drawings herein for convenience in understanding the invention. The Arnold machine is a highly satisfactory and useful machine operating to make and apply tufts as specified, but said machine requires the constant attendance of an operator, who, by hand, feeds the loops 84 of the heading 83 onto the prong 66 of the forked die of said machine, said machine thereupon operating automatically to make and apply and secure the tuft to said loop. The present exemplification of my invention is in the form of an attachment to said machine for automatically and successively feeding the loops 84 of the heading 83 to said machine whereby the necessity for the constant attendance of the operator is obviated, the quantity of the output of the machine greatly increased, and a more uniform product produced. To this end I apply a supporting bracket 135 to the front portion of the frame of said machine and mount on the underside of said bracket a bell crank lever 136, said bell crank lever being fulcrumed at 137 on said bracket. One arm of said bell crank is provided with a longitudinal slot 138 and a pivot block 139 is pivotally and adjustably mounted in said slot by means of the bolt 140. A connecting rod 141 has its corresponding end adjustably secured to the block 139 as indicated. The other end of the connecting rod 141 is operatively connected by means of a ball and socket joint 142 with the end of a lever 143 which is fulcrumed at 144′ on a supporting bar 144 secured to the forward side of the frame of said machine. The lever 143 is provided with a longitudinal slot 145 having a sliding connection with a crank pin 146 on a cam member 147 secured to the shaft 38 of said machine which is extended sufficiently for the purpose, said connection operating as will be readily understood to cause oscillation of the bell crank 136 as the shaft 38 rotates. It will also be noted that the connection is adjustable so that the extent of said oscillation may be varied as desired.

The other arm of the bell crank 136 is provided with a longitudinal slot 148 having an adjustable pivotal connection 149 with the end of a link 150. As best shown in Figs. 7, 9 and 1 the link 150 is pivotally connected with one end of a reciprocating rod 151 mounted in a suitable guide as shown and having its other end connected with a bracket 152 as best shown in Figs. 7 and 3. The bracket 152 is slidable against the underside of a guide 153 having a clamping block 154 slidably mounted on top thereof, said bracket 152 being rigidly secured to the clamping block 154 by means of bolts as shown. The clamping block 154 is arranged to receive one end of a reciprocating feed rod 155 best shown in Figs. 3, 2 and 1. The feed rod 155 is perforated to pass over a lock pin 156 and is held in place thereon by means of a swinging clamping bar 157 detachably held in place by means of a swinging bolt 158 engaging a notch 159 in its free end. By this arrangement it will be noted that the feed rod 155 may be readily detached and removed from said clamping block 154 when desired. The feed rod 155 is arranged to reciprocate in a guide tube 160, said guide tube being rigidly clamped in a clamping block 161 rigidly secured to the upper side of the guide bar 153 as best shown in Figs. 2, 4 and 7. The clamping block 161 is provided with a swinging clamping bar 162 which is held in place by means of a swinging bolt 163 engaging a slot 162′ and whereby said tube 160 may be removably clamped in position on said guide bar 153, said tube projecting thence into co-operation with the parts of the machine as shown. As best shown in Figs. 1 and 8 the guide tube 160 rests at its inner end between grooved guide rollers 164, the grooves in said guide rollers loosely fitting said tube so as to permit of the free passage of the guide loops 84 to the machine. At its inner end the guide tube 160 is arranged in co-operative relationship with the forked die 63 and the plunger die 59 of the said Arnold machine, said end of tube being provided with a notch 165 which serves to expose the inner end of the feed rod 155. The inner end of the feed rod 155 is provided with a longitudinal slot 166 adapted and arranged to pass over the forked die 63 as indicated by the dotted lines in Fig. 13. The extreme inner end of the feed rod 155 is also provided with a transverse notch 167 adapted and arranged to engage the loops 84 as best shown in Figs. 15 and 16.

In the normal operation of the machine of the Arnold patent a wire band or binding 82 is severed and bound around the tufts 78 by the co-operative action of the forked die 63 and the plunger die 59. The parts of the attachment are so arranged and designed that just previous to such binding of said wire a loop 84 is placed over the prong 66 of the forked die 63 so that said wire is caused to pass through said loop in the binding operation, thus not only forming the tuft 78 but also securing said tuft to said loop. The arrangement is such that at each reciprocation of the rod 155, as said rod is drawn back it passes outwardly through one of the loops 84 so that at the next inward movement of said rod said loop is engaged by the notch 167 and carried into the machine, being thereby placed in position so that at the next movement of the forked die 63 the prong 66 of said die will pass through said loop and hold the same in position to be engaged and bound by the binding wire as explained above. When the parts are retracted the prong 66 is automatically withdrawn from said loop and the weight of the material causes the same to fall away from the moving parts of the machine. The arrangement is such that as each loop is thus drawn up to position for engagement by the prong 66 the next succeeding loop is drawn up to position in the notch 165 for engagement by the feed bar 155 so that at each reciprocation of said feed bar a new loop will be presented to the forked dies 166 and whereby said loops will be automatically and successively fed to said die as will be readily understood.

The loops 84 are preferably placed upon the guide tube 160 as follows: The looped heading 83 is formed with the loops 84 thereon in an ordinary narrow fabric or ribbon weaving loom operating in the usual way to weave said heading with the loops 84 threaded on the usual wire of such machine. For convenience in co-operation with the guide tubes 160 of the present machine, this guide wire of said weaving machine is extended around the usual take-up rollers and sufficiently beyond to accommodate the necessary length of heading and such length of heading permitted to accumulate on said wire as it is automatically made and delivered from said weaving loom as will be readily understood by those skilled in the art. In order to facilitate removal of such heading from said loom wire onto the guide tube 160 I provide a juncture member 168 having one end the same size as the said wire 169 of said weaving loom. The other end of said juncture member is of a size to fit snugly within the end of the tube 160, being provided with a slot or bifurcation 170 to permit of yielding engagement with said tube. The juncture member 168 is provided with a shoulder 171 fitting snugly against the end of said tube, said juncture member being conically formed to thus constitute a smooth continuation of both the wire and the tube. In practice when a sufficient length of looped heading has been accumulated on the wire 169 the same is readily transferred by hand to one of the guide tubes 160 by fitting a juncture member 168 into the end of the tube and fixing said juncture member in registration with the end of the wire 169, whereupon the operator may readily by hand slide the loops 184 in groups or handfuls onto the tube 160, of course severing the end of the heading when the tube is loaded. When the tube 160 has thus been loaded with the looped heading the juncture member 168 is removed and the loaded tube arranged in the machine in the position indicated in Fig. 1, with the feed rod 155 reciprocating therethrough as described above. The feed rod will thus operate to automatically feed the loops 84 of said heading into the machine where each loop will be provided with a tuft by the automatic action of said machine as explained above. In this manner the tufts will be rapidly, automatically and economically applied to the looped heading without the constant attention of an operator to feed each loop into the machine. In this manner such work may be done with great uniformity and economy of labor. By adjusting the parts to give greater movement to the rod 155 a plurality of loops may be fed at each operation and thus the loops bound by the tufts in groups.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

I claim:

1. The combination with a machine for applying ornamentation to the loops of a looped heading, of an outer guide for said loops arranged in operative relation to said machine; and a reciprocating feed member mounted within said guide and operating to feed said loops successively to said machine, substantially as described.

2. The combination with a machine for applying ornamentation to the loops of a looped heading, of an outer tubular guide for said loops arranged in operative relation to said machine; and a reciprocating feed member mounted within said guide and operating to feed said loops successively to said machine, substantially as described.

3. The combination with a machine for applying ornamentation to the loops of a looped heading, of a tubular guide member for said loops arranged in operative relation to said machine; and a reciprocating feed member mounted within said guide, the discharge end of said guide being notched to expose partially the end of said feed member and said end of said feed member being transversely notched to engage said loops, substantially as described.

4. The combination with a machine for applying ornamentation to the loops of a looped headin, of a tubular guide member for said loops arranged in operative relation to said machine; and a reciprocating feed member mounted within said guide, the discharge end of said guide being notched to expose partially the end of said feed member and said end of said feed member being transversely notched to engage said loops and longitudinally notched to accomodate parts of said machine, substantially as described.

5. The combination with a machine for applying ornamentation to the loops of a looped heading including a reciprocating forked die and a cooperating reciprocating plunger die, of an outer guide for said loops arranged in operative relation to said dies; and a reciprocating feed member mounted within said guide and operating to feed said loops successively to said forked die, substantially as described.

6. The combination with a machine for applying ornamentation to the loops of a looped heading, including a reciprocating forked die and a cooperating reciprocating plunger die, of a tubular guide member for said loops arranged in operative relation to said dies; and a reciprocating feed member mounted within said guide, the discharge end of said guide being notched to expose partially the end of said feed member and said end of said feed member being transversely notched to engage said loops, substantially as described.

7. The combination with a machine for applying ornamentation to the loops of a looped heading, including a reciprocating forked die and a cooperating reciprocating plunger die, of a tubular guide member for said loops arranged in operative relation to said dies; and a reciprocating feed member mounted within said guide, the discharge end of said guide being notched to expose partially the end of said feed member and said end of said feed member being transversely notched to engage said loops and longitudinally notched to accommodate said forked die, substantially as described.

8. The combination with a machine for applying ornamentation to the loops of a looped heading, including a reciprocating forked die and a cooperating reciprocating plunger die, of a guide tube for said loops; a detachable clamping member adapted and arranged to engage the outer end of said tube, said tube projecting thence into operative relation with said dies; grooved guide rollers loosely supporting the inner end of said tube to permit the free passage of said loops; and a reciprocating feed member mounted within said guide tube, the discharge end of said guide tube being notched to expose partially the end of said feed member and said end of said feed member being transversely notched to engage said loops, substantially as described.

9. The combination with a machine for applying ornamentation to the loops of a looped heading, including a reciprocating forked die and a cooperating reciprocating plunger die, of a guide tube for said loops; a detachable clamping member adapted and arranged to engage the outer end of said tube, said tube projecting thence into operative relation with said dies; grooved guide rollers loosely supporting the inner end of said tube to permit the free passage of said loops, and a reciprocating feed member mounted within said guide tube, the discharge end of said guide tube being notched to expose partially the end of said feed member and said end of said feed member being transversely notched to engage said loops and longitudinally notched to accommodate said forked die, substantially as described.

10. A feeding attachment comprising an outer guide for the loops of a member; and means operating through the interior of said guide for automatically and successively feeding said loops from said guide, substantially as described.

11. A feeding attachment comprising an outer tubular guide for the loops of a member; and means operating through the interior of said guide for automatically and successively feeding said loops from said guide, substantially as described.

12. A feeding attachment comprising a guide tube for the loops of a member; and a reciprocating feed member mounted within said guide tube, the discharge end of said guide tube being notched to expose partially the end of said feed member and said end of said feed member being transversely notched to engage said loops, substantially as described.

13. A feeding attachment comprising a guide tube for the loops of a member; and a reciprocating feed member mounted within said guide tube, the discharge end of said guide tube being notched to expose partially the end of said feed member and said end of said feed member being transversely notched to engage said loops and longitudinally notched to accommodate parts of a cooperating machine, substantially as described.

14. The combination with a weaving machine wire, of a movable guide tube for receiving loops, and a juncture member having one end substantially the size of said wire and the other end of a size to fit within said tube, there being a shoulder fitting against the end of said tube to form a smooth continuation for transfer of loops from said wire to said tube, the end of said juncture member fitting within said tube being bifurcated and of a size to effect a yielding spring engagement with said tube, substantially as described.

15. A structure adapted to cooperate with a machine for applying ornamentation to the loops of a looped heading, including a reciprocating forked die and a cooperating reciprocating plunger die, said structure comprising an elongated feed guide having at least one free end adapted to receive the loops to be fed, clamping means releasably engaging one end portion of said feed guide, and means loosely engaging the other end of said feed guide and supporting it in adjacent relation to said forked die for the feeding of loops therefrom onto said forked die.

16. A structure for cooperation with a machine for applying ornamentation to the loops of a looped heading, including a reciprocating forked die and a cooperating reciprocating plunger die, an elongated feed guide having one free end adapted to receive a supply of loops to be fed from the guide, a support member equipped with a clamp for releasably engaging one end portion of said feed guide to support the same in alignment with said dies, means for loosely supporting the other end of said feed guide adjacent said forked die, and means for drawing a loop upon said forked die.

ROBERT E. WALLISER.